April 1, 1924.  
R. M. HENNESSY  
TRAP NEST  
Filed Dec. 15, 1922

R. M. Hennessy,
Inventor

By C. A. Snow & Co.
Attorneys

April 1, 1924.
R. M. HENNESSY
TRAP NEST
Filed Dec. 15, 1922    2 Sheets-Sheet 2
1,489,212
Fig. 4.
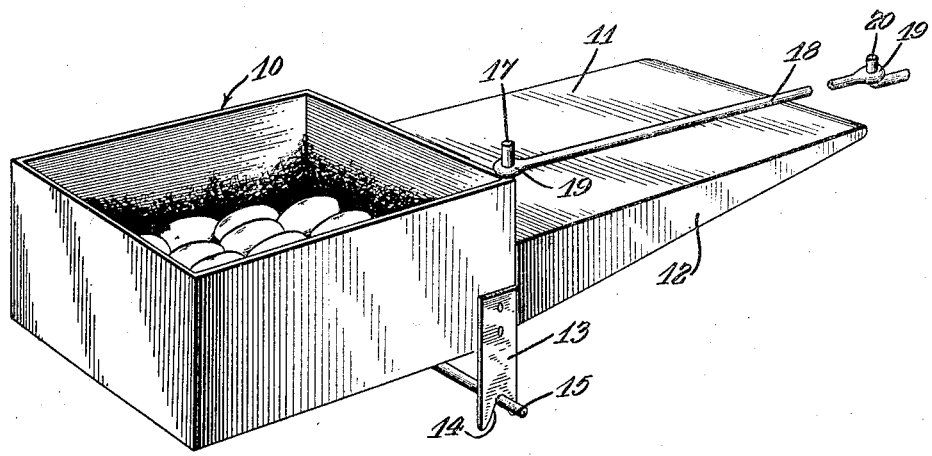
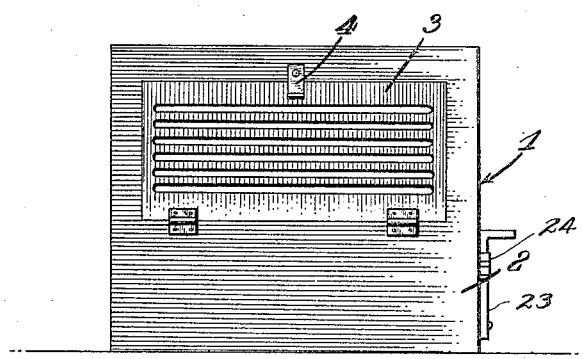
Fig. 5.
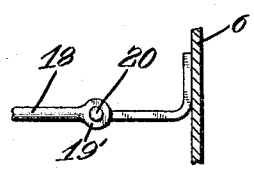
Fig. 6.
R. M. Hennessy,
Inventor
By *[signature]*
Attorneys Patented Apr. 1, 1924.

1,489,212

UNITED STATES PATENT OFFICE.

RICHARD M. HENNESSY, OF WAYLAND, MISSOURI.

TRAP NEST.

Application filed December 15, 1922. Serial No. 607,124.

*To all whom it may concern:*

Be it known that I, RICHARD M. HENNESSY, a citizen of the United States, residing at Wayland, in the county of Clark and State of Missouri, have invented a new and useful Trap Nest, of which the following is a specification.

This invention relates to poultry apparatus and more particularly to trap nests.

The object of the invention is to construct a simple and efficient nest of this character which on the entry of the bird will trap her, but which may be so set that she may leave and enter at will or it may be set so that after her entry she will be held until released.

Another object is to provide a nest of this character in which the egg receiver or nest proper is removably mounted and so constructed that the door which affords ingress and egress of the bird, that the entry of the bird will close the door, and the bird on leaving the nest or egg holder will open the door.

Another object is to provide adjustable means for varying the weight required to tilt the nest proper.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Fig. 4 is a perspective view of the nest proper in its cooperating parts.

Fig. 5 is a rear elevation of the outside casing constituting a part of the nest, and Fig. 6 is a detail showing the connection of the nest operated rod with the door which it controls, the door being shown in section.

Figure 1:
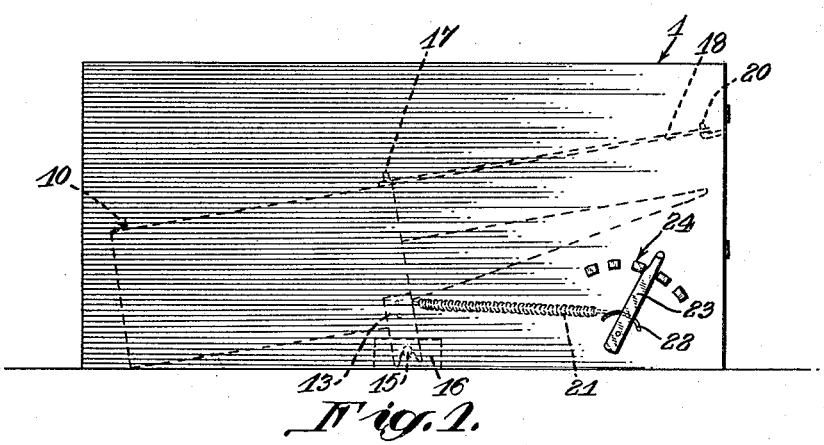
Figure 1 represents a side elevation of a nest constructed in accordance with this invention, with the egg receptacle and the nest proper and its cooperating parts shown in dotted lines.
Figure 2:
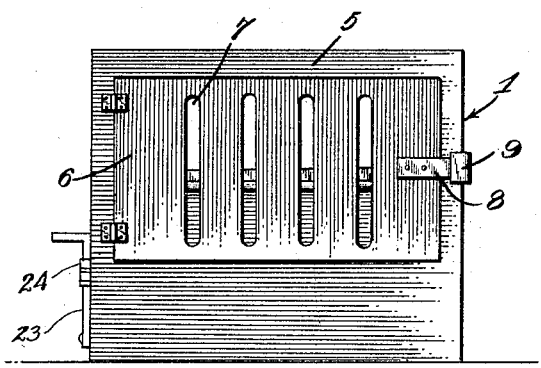
Fig. 2 is a front elevation thereof.
Figure 3:
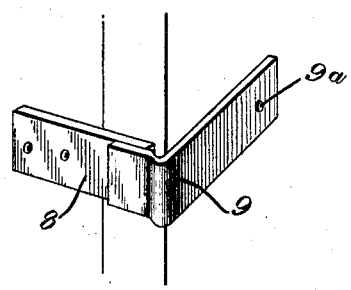
Fig. 3 is a detail perspective view of the latch for securing the door to the outer casing.

In the embodiment illustrated, an outer casing or shell 1 is shown preferably composed of sheet metal, although not necessarily so, and which may be of any desired configuration, being here shown rectangular. This casing 1 has an opening in the rear 2 thereof closed by a ventilating closure 3 which is held secured by a pivoted latch 4. This closure 3 in addition to forming ventilating means for the nest is designed to afford access to the interior for the insertion and removal of eggs.

The front of the casing 1 also has an opening with the closure 6 hinged to swing laterally in open position and equipped with a plurality of ventilating slots 7.

The fastening for this closure constitutes, as shown, a metal strap 8 secured to the closure and projecting at one end beyond the front edge thereof and which is designed when the door is closed to be engaged by a spring latch 9 pivotally mounted at $9^a$ on one side wall of the casing, so that when it is desired for use, this catch may be swung up to escape the strap 8 and prevent the door being held thereby for a purpose presently to be described.

Mounted in the casing 1 is an egg holder or nest proper 10 which is here shown rectangular in form and open at its top. Projecting forwardly from the front end of this nest 10 is a platform 11 which together with the nest is preferably constructed of sheet metal, the sides 12 of which are bent down and secured to the front of the nest to form braces for the platform.

Depending from the opposed sides of the nest near the front thereof are hangers 13, here shown in the form of metal straps riveted to the nest and provided in their lower ends with notches as 14 which are designed to straddle a rod 15 which is arranged transversely across the casing 1 near the bottom thereof and is preferably mounted in bearing blocks or plates 16 secured to the inner face of the side walls of the casing. This mounting of the nest on the rod 15 provides for its tilting movement so that when a hen or other bird steps on the platform 11, the nest will be tilted forwardly and when she steps into the nest 1, it will be tipped rearwardly for a purpose presently to be described.

Projecting upwardly from one front corner of the nest 10 is a stud 17 with which is pivotally connected an eye 19 carried by one end of a rod 18. This rod 18 extends forwardly and is equipped at its front end with another eye 19′ which is adapted to pivotally engage an upstanding stud 20 mounted on the inner face of the door 6. This connection of the door with the nest by means of the rod 18 provides for the opening and closing of the door on the tilting of the nest in opposite directions, for instance, the forward tilting of the nest will, through the rod 18, operate to push the door 6 open and the rearward tilting of the nest will exert a pull on rod 18 and close the door.

It will thus be seen that when the latch 9 is swung up out of engaging position with the strap 8 that the hen may enter and leave the nest at will since when she passes out by stepping onto the platform 11, the door 6 will be forced open and will remain so until she returns and enters the nest 10, when her weight will cause the nest to tilt rearwardly and exert a pull on the rod 18 and close the door, thus affording her protection against the entrance of other fowls or the like.

A coiled compensating spring 21 is connected at one end to one front corner of the nest 10 and at its other end extends through an arcuate slot 22 in the side wall of the casing 1, and is secured to a lever 23. This lever 23 is fulcrumed on the outer face of the side wall of the casing and is designed to be interlockingly engaged with a rack 24 mounted on the casing so that the tension of the spring 21 may be varied according to the position of the lever in the rack to determine the point or rather the weight necessary to tilt the nest 10.

When the nest is designed to be used for trapping a hen for any purpose, the latch 9 is set so as to be in the path of the catch 8 and the door 6 is opened ready for a hen to enter. The hen entering the nest will walk up on the platform 11 which normally rests on the lower wall of the opening closed by the door 6, and when she reaches the egg receiver, or nest proper 10, her weight will cause the nest 10 to tilt on rod 15 and to exert a pull on rod 18, and thereby close the door 6. This door when so closed will be held by the interengaging of the members 8 and 9 and cannot be opened until manually released.

Various changes in the form, shape, proportion and other minor details of construction may be made without departing from the principle or sacrificing any of the advantages of the claimed invention.

I claim:—

In a nest of the class described an enclosing casing having an entrance, a nest proper mounted for tilting movement in said casing, a platform extending from the front of said nest to a point adjacent the entrance opening and on which the bird steps when approaching or leaving the nest, and a lever and rack connection adjustable to control the weight required for tilting the nest, and a coiled spring connected with said nest and with said lever.

In testimony that I claim the foregoing as my own, I have hereto affixed my signature in the presence of two witnesses.

RICHARD M. HENNESSY.

Witnesses:
 ROBERT SHEA,
 J. A. MOEHN.